Sept. 12, 1950 J. W. WADDELL ET AL 2,522,414
SIREN CONTROL
Filed Aug. 13, 1948
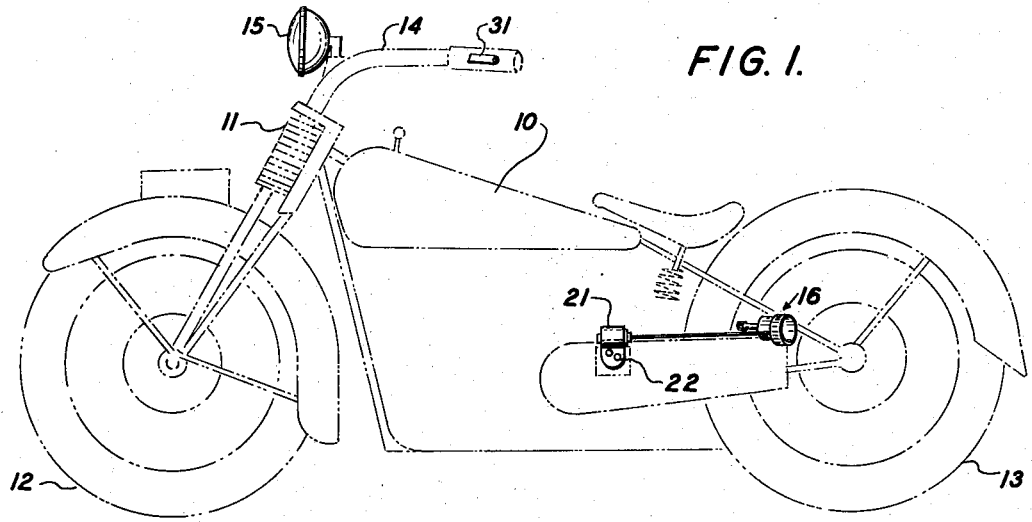
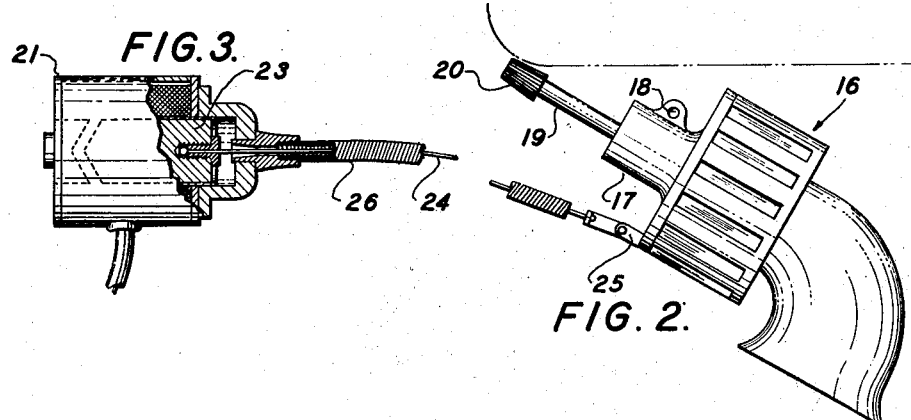
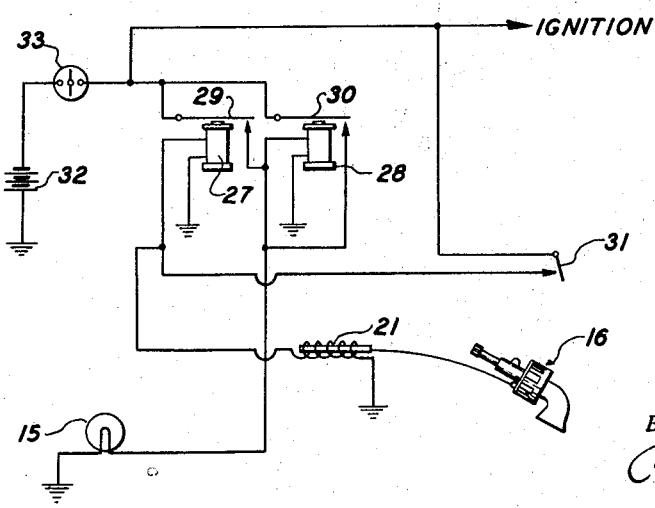
INVENTOR.
JOHN W. WADDELL
BERT R. STOLTZ
BY
ATTORNEY Patented Sept. 12, 1950

2,522,414

UNITED STATES PATENT OFFICE 2,522,414

SIREN CONTROL

John W. Waddell and Bert R. Stoltz, Huntington Park, Calif.; said Waddell assignor to said Stoltz Application August 13, 1948, Serial No. 44,154

6 Claims. (Cl. 177—7)

1

This invention relates to automatic controls and more especially to a remote control for operating a siren of a motor-cycle.

An object of the invention is to provide a simple, practical and inexpensive control of the character described.

Another object of the invention is to provide an electromechanical operating control for the siren of a motor-cycle.

Another object of the invention is to provide an electromechanical control for the operation of a siren of a motor-cycle which may be actuated by a hand switch on one of the handle bars of the motor-cycle, thereby eliminating the usual pedal type actuator.

An additional object of the invention is to provide a semi-automatic siren control which may include operation of the red light or other lamp carried by the vehicle.

An additional object of the invention is to provide in a control the character referred to in the preceding object of novel means for maintaining the red lamp illuminated until the ignition switch of the vehicle has been moved to "off" position.

Other objects and advantages will appear and be brought out more fully in the following specification, reference being had to the accompanying drawing wherein:

Fig. 1 is a diagrammatic view of a motor-cycle showing our invention in association therewith.

Fig. 2 is an enlarged plan view of the siren shown also in Fig. 1.

Fig. 3 is an enlarged view, partly in section, showing a solenoid magnet for actuating the siren of Fig. 2.

Fig. 4 is a wiring diagram of a circuit employed for the siren control of Figs. 1 to 3.

The general purpose of this invention is to provide a manually actuated semi-automatic control for operating the siren of a motor-cycle as used generally by motor-cycle police officers and others. In the operation of such sirens as it has been accomplished heretofore, the siren housing is mounted on a pivot and the siren is rotated or tilted on its pivot to cause engagement of a friction wheel on the siren shaft with a portion of a wheel of the vehicle, such that the siren shaft is rotated by the vehicle wheel and the pitch or sound of the siren is approximately proportionate to the speed of the vehicle. Heretofore the rotation of the siren housing to effect this engagement of the siren shaft with the tire of the vehicle is accomplished by a wire or cable which is pedal actuated, requiring the driver of the vehicle to place his foot on the pedal to accomplish

2 this operation. Frequently the officer when making a quick start or when busy with involved traffic conditions, finds it difficult to effect this pedal engagement to start the siren because of other necessary use of his feet in the operation of the vehicle. Furthermore, he often finds it difficult to manually turn on his red light, which is another important phase of operation of his vehicle while in pursuit.

Our invention eliminates all of the aforementioned disadvantages by providing the semi-automatic control about to be described.

Referring more particularly to the drawing we show a motor vehicle such as a motor-cycle 10 having a frame structure 11, front wheel 12, rear wheel 13, handle bars 14, and a lamp 15 which may be the red light usually carried by police or other emergency vehicles.

A siren 16 is mounted on the motor-cycle 10 and comprises a housing 17 having a suitable pivot mounting 18 on frame 11, a shaft 19 and a friction wheel 20 adapted to be engaged with the tire of wheel 13 when the siren housing 17 is rocked or rotated on pivot 18. A solenoid magnet 21 is provided with a bracket 22 by which it is suitably secured to frame 11. Magnet 21 has a plunger or armature 23 connected to a flexible wire or cable 24, the other end which is connected to a bracket 25 on siren housing 17. A flexible shield 26 for wire 24 may be provided if desired, and is generally similar to the throttle cable of motor vehicles generally.

A lamp relay 27 and a holding relay 28 are suitably mounted at any convenient position on the vehicle, and include relay switch arms 29 and 30 respectively. A manually actuated switch 31 such as a microswitch, is mounted on one of the handle bars of the motor-cycle 10 in any convenient manner. The electrical circuit includes battery 32 and ignition switch 33 for controlling the ignition of the engine of the vehicle.

The operation of the invention should be clear from the foregoing description. Upon the closing of microswitch 31, relay 27 and solenoid magnet 21 will be actuated, thereby rotating siren housing 17 to cause engagement of shaft wheel 20 with the tire of wheel 13, and upon movement of the vehicle the siren will operate. The operation of relay 27 will energize relay 28, and arm 30 thereof will close a circuit through red lamp 15. The circuit through relay 28 will be continued until ignition switch 33 has been opened, which will be the condition after the vehicle has been brought to a full stop. Thus after siren 16 has been once started by even a momentary closing of switch 31, red light 15 will be kept on until the vehicle has been brought to a full stop, and/or the ignition switch 33 opened.

It will be understood that the foregoing description is illustrative rather than restrictive of their invention and that changes and modifications may be made without departing from the spirit and scope of the sub-joined claims. For example, wire 24 may be of any desired length and may be shortened such that solenoid 21 may be mounted adjacent siren housing 17 and connected thereto by short link.

Having described my invention, what I claim is:

1. A vehicle siren control as described for a pivoted siren, comprising in combination magnetic means for pivoting said siren, a battery to energize said means, an ignition switch, a holding relay and a control switch, and a lamp relay for a lamp actuatable to operative position by said control switch, said holding relay being actuatable to lamp holding position by said lamp relay said lamp holding relay being actuatable to inoperative position by said ignition switch whereby said lamp, after being turned on by said control switch and lamp relay, is retained "on" until said ignition switch is turned "off."

2. A vehicle siren control for a siren having a pivoted housing, and a drive shaft provided with a friction drive wheel, comprising in combination magnetic means for pivoting said housing to engage said friction drive wheel with a vehicle wheel, a battery to energize said means, a control switch, an ignition switch, a lamp, a relay for said lamp having a holding circuit, and a control switch actuated relay for initially actuating said first relay whereby said siren is actuated and said lamp is lighted when said control switch is closed.

3. A vehicle siren control for a siren having a pivoted housing, and a drive shaft provided with a friction drive wheel, comprising in combination magnetic means for pivoting said housing to engage said friction drive wheel with a vehicle wheel, a battery to energize said means, a control switch, an ignition switch, a lamp, a relay for said lamp having a holding circuit, and a control switch actuated relay for initially actuating said first relay whereby said siren is actuated and said lamp is lighted when said control switch is closed and said lamp remains lighted after said control switch is opened.

4. A vehicle siren control for a siren having a pivoted housing, and a drive shaft provided with a friction drive wheel, comprising in combination magnetic means for pivoting said housing to engage said friction drive wheel with a vehicle wheel, a battery to energize said means, a control switch, an ignition switch, a lamp, a relay for said lamp having a holding circuit, and a control switch actuated relay for initially actuating said first relay whereby said siren is actuated and said lamp is lighted when said control switch is closed and said lamp remains lighted after said control switch is opened and until said ignition switch is opened.

5. A vehicle siren control for a siren having a pivoted housing, and a drive shaft provided with a friction drive wheel, comprising in combination magnetic means for pivoting said housing to engage said friction drive wheel with a vehicle wheel, a battery to energize said means, a control switch, an ignition switch, a lamp, a relay for said lamp having a holding circuit, and a control switch actuated relay for initially actuating said first relay whereby said siren is actuated and said lamp is lighted when said control switch is closed and said lamp remains lighted after said control switch is opened and until said ignition switch is opened, said magnetic means including a solenoid having a plunger connected to said housing.

6. A vehicle siren control for a siren having a pivoted housing, and a drive shaft provided with a friction drive wheel, comprising in combination magnetic means for pivoting said housing to engage said friction drive wheel with a vehicle wheel, a battery to energize said means, a control switch, an ignition switch, a lamp, a relay for said lamp having a holding circuit, and a control switch actuated relay for initially actuating said first relay whereby said siren is actuated and said lamp is lighted when said control switch is closed and said lamp remains lighted after said control switch is opened and until said ignition switch is opened, said magnetic means including a solenoid having a plunger connected to said housing, said magnetic means including a solenoid having a plunger and a cable connected to said plunger and said housing.

JOHN W. WADDELL.
BERT R. STOLTZ.

REFERENCES CITED

The following references are of record in the file of this patent:

UNITED STATES PATENTS

| Number | Name | Date |
|---|---|---|
| 1,520,225 | Cosgrave et al. | Dec. 23, 1924 |
| 1,958,633 | Miles | May 15, 1934 |
| 2,068,427 | Menssdorffer | Jan. 19, 1937 |
| 2,172,413 | Scott | Sept. 12, 1939 |